H. J. STEAD.
BIFOCAL LENS AND METHOD OF MANUFACTURING THE SAME.
APPLICATION FILED NOV. 5, 1919.

1,413,945.

Patented Apr. 25, 1922.
2 SHEETS—SHEET 1.

Inventor
By Harold J. Stead
Denison Thompson
Attorney.

H. J. STEAD.
BIFOCAL LENS AND METHOD OF MANUFACTURING THE SAME.
APPLICATION FILED NOV. 5, 1919.

1,413,945.

Patented Apr. 25, 1922.
2 SHEETS—SHEET 2.

UNITED STATES PATENT OFFICE.

HAROLD J. STEAD, OF GENEVA, NEW YORK.

BIFOCAL LENS AND METHOD OF MANUFACTURING THE SAME.

1,413,945. Specification of Letters Patent. Patented Apr. 25, 1922.

Application filed November 5, 1919. Serial No. 335,801.

*To all whom it may concern:*

Be it known that I, HAROLD J. STEAD, of Geneva, in the county of Ontario, in the State of New York, have invented new and useful Improvements in Bifocal Lenses and Methods of Manufacturing the Same, of which the following, taken in connection with the accompanying drawings, is a full, clear, and exact description.

This invention relates to certain improvements in bifocal lenses and method of manufacturing same.

During the early stages of the development of bifocal lenses, Gregg, in his Patent No. 59,995, and later Alexander, in his Patent, No. 954,772, taught the grinding of two fields of vision concentric in a single piece of glass. The two fields were separated by a vertical shoulder of more or less height, dependent upon the extent to which the relative grinding of the surfaces was carried. Later, Connor, in his Patent, No. 932,965, described the simultaneous generation or grinding of two surfaces so that said surfaces would meet in a line with an absolute absence of an intervening shoulder.

It is generally recognized that in the use of bifocal lenses having a sharply defined line of demarkation or a shoulder between the two visual surfaces the muscles and focusing apparatus of the eye are called upon to effect an unnatural accommodation when the vision is changed from one field to the other. It appears that no matter how sharply the line of division between the two parts of a bifocal lens may be, no matter how finely finished the lens is at this juncture, it is of no avail in improving the vision; in fact, by reason of this sharp definition and the abrupt change from one field to the other, the eye is severely shocked and the muscles considerably strained by encountering in passing over this line reversed increased or decreased optical conditions.

Spherical aberration has from the very beginning been fixed in the mind of the optician as a condition indicative of poor quality, to be avoided so far as possible; and strange as it may seem, my invention makes valuable use of a field of "aberration" (heretofore so hateful to the optician) to form an inclined transition zone between the two fields of vision. My invention was conceived as a result of my belief that a sharp line of division between the two fields in bifocal lenses is not only not a feature of the ideal lens as imagined by Connor, but in fact is a disadvantageous condition. Various authorities have recently reached the same conclusion and have suggested that the commercial bifocal lens having a sharp line of division between the two fields be temporarily modified by marking in ink a line upon the smooth surface of the lens to coincide with the division line between the upper and the lower fields. Such a line is so much in evidence as the wearer shifts his gaze from far to near that he learns in a short time to pass clear over the line. When he acquires that habit, bifocal lenses cease to bother him. These suggestions of the authorities clearly demonstrate that the sharp line of division between the two fields, as described by Connor, is not the ideal condition.

My invention, therefore, starting from the Gregg lens, progresses towards the ideal lens in a distinctly different direction than that followed by Connor in that instead of grinding one field to the level of the other at the line of joinder to avoid the production of a shoulder, I propose to purposely produce and utilize the shoulder between the two fields of vision of the Gregg lens as a formative region for a zone of aberration constituting a transition area between the two optical fields, following the general theory that a person can more easily run up or down an incline from one elevation to another than use a pair of steps.

My invention, therefore, consists in the method of formation of a zone of variable refractive power intermediate the two optical fields. Paige, in his Patent No. 1,271,356, describes an "optical transition zone" between the major and minor lens surfaces, but such a zone is difficult to produce and expensive in manufacture and not adapted for effecting the objects of my invention.

The zone formed intermediate the two optical surfaces by my process is of non-optical character, of irregular and uncertain curvature, and constitutes an inclined surface leading across one field to the other field of vision, such fields of vision being at different elevations, and said zone merging into both fields of vision with a general curvature of the merging places corresponding to the curvature of the particular field into which it passes. Therefore, when the eye leaves one field, for instance, the reading field, it does not jump abruptly from a field of one refractive power to a field of materially different refractive power, but rather passes gradually across the non-optical zone of varying and uncertain curvature corresponding to the gradual inclination of the surface necessary to connect the two optical zones, so that the eye gradually accommodates itself to the increase or decrease of curvature of the zone, and finds itself passing into the field of distance vision without noticing any material difference in curvature, and without being subjected to sudden change of refractive power.

My process consists in first grinding the two fields of vision upon one side,—preferably the inner or concave side,—of a piece of glass adapted for a lens.

The curve forming the distance field of the lens may be ground first over the entire surface of the piece of glass with a grinding tool of a curvature suitable for performing that operation. The reading field may then be ground with a grinding tool having a curvature suitable for performing that operation. The distance field is then ground with a grinding tool having its central portion cut away so as not to come in contact with the reading field of vision formed at the center. The distance field is ground until the reading field projects slightly above the plane of the surrounding parts of the distance field, forming a shoulder of variable height, according to the extent to which the grinding is continued,—all in the manner described by Gregg.

The lens must then be polished and this operation so far as the reading portion is concerned, is effected by placing the same in contact with a rotary buff wheel formed of flexible material such as muslin,—the diameter of the wheel being substantially the same as the diameter of the curve, of which that formed on the reading field of the lens is a section. The polishing material is applied to the wheel which is rotated at high speed. The lens is also rotated on the periphery of the wheel so that the wheel covers every section of the reading portion and the polishing is uniformly effected.

It is found that the operation of this process rounds off the sharp corner of the shoulder intervening between the distance and reading fields and almost entirely obliterates the shoulder, producing in place thereof a narrow zone which assumes an inclined plane from one field to the other. This zone has a varying curvature, and is not designed to be of any value for visional purposes, but provides an easy transition for the eye of the wearer from one field to the other, perhaps of such a character that the eye gets the habit of jumping from one field to the other in a manner similar to that caused by the ink line before referred to.

The distance portion of the lens may be polished on an ordinary hand lens surface grinding machine, using a cast-iron polishing tool which is faced with felt. The central portion of this tool is cut away to form an opening of greater diameter than the diameter of the reading portion of the lens so that a slight oscillation of the lens on the face of the polisher will be permitted, without contact with the reading field. By proper adjustment, the lens is permitted and may by the hand of the operator be caused to oscillate to such an extent that the edge of the polisher extends into or across the transition zone formed by polishing or rubbing off the shoulder, as described. This operation of the polisher for the distance field completes the action necessary to produce the zone of variable curvature between the distance and reading fields, practically entirely eliminating the shoulder and forming in its place a transition zone constituting an inclined surface connection for the two fields and merging mechanically and optically with both.

In the drawings, I have illustrated my completed lens.

Fig. —1— is a face view of the lens, showing a series of parallel lines as viewed through the lens.

Fig. —2— is a similar view with the dotted lines bordering the transition zone omitted.

Figure 1:
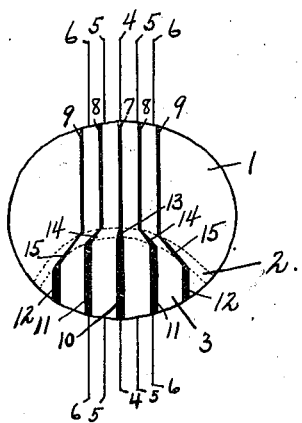
Figure 2:
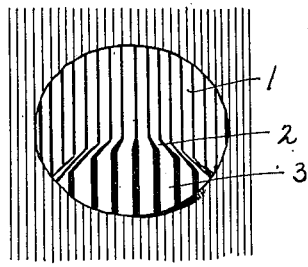

In the drawings, —1— is the distance field; —3—, the reading field; and —2—, the transition zone.

Parallel lines —4—, —5—, and —6— are slightly magnified and displaced as —7—, —8—, and —9— by the distance portion —1— when viewed through a convex lens. This effect is increased by the reading portion as seen at —10—, —11—, and —12—. The transition zone —2— relieves the eye from abrupt change when passing from one field to the other. The magnification is increased from the distance field to the reading field as shown at —13—, —14—, and —15—. This transition zone is not a field of vision. The wearer uses the distance and reading fields as in other bifocals. The intermediate field is a blending of the two fields and acts to avoid shock when transition is made from one field to the other.

Figure 3:
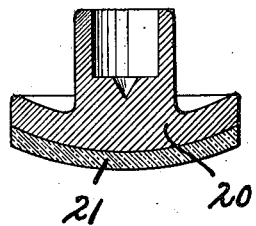
Figure 3 is a view of a tool that may be used for grinding across the entire surface of the blank.
Figure 4:
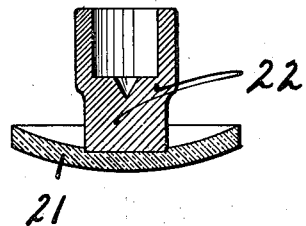
Figure 4 illustrates a method of forming the reading surface.
Figure 6:
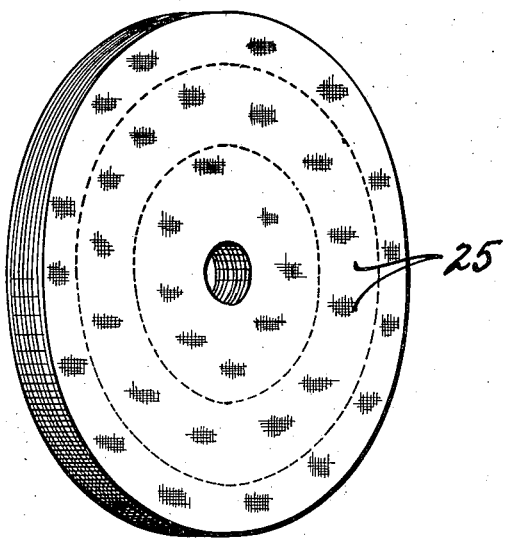
Figure 6 illustrates the fabric or buff wheel for polishing across the reading and distance surfaces, particularly used for polishing the reading surface.
Figure 7:
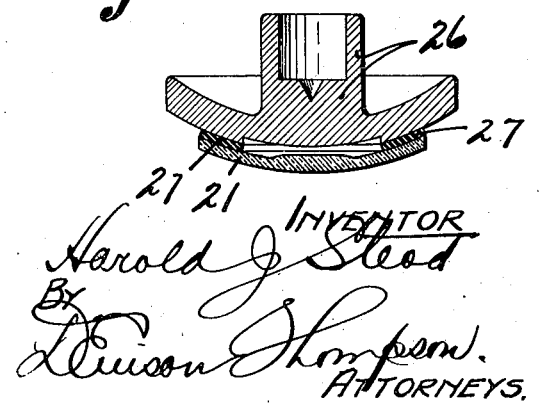
Figure 7 illustrates the tool used particularly for polishing the distance surface.

The tool —20— shown in Figure 3 is a perhaps of a curvature suitable for grinding upon the blank —21— a curvature for distance vision purposes. The tool —22— shown in Figure 4 is of a size and curvature for grinding upon the inner surface of the blank —21— an area at the center of the blank with a curvature suitable for reading vision when combined with the curvature of the outer face of the blank, as indicated. The distance surface of this blank may then be further ground by means of a tool —23— shown in Figure 5 having a central circular opening of a size so as to surround and define the reading surface already formed. The grinding by means of the tool —23— will produce a shoulder between the two fields of vision. Preferably the distance surface is ground below the reading surface so that in effect the reading surface is a circular space elevated at the center of the blank —21—. The blank should then be polished in any suitable manner, as described, by holding it by hand against a rotating buff wheel —25— shown in Figure 6, the lens preferably being turned by hand during engagement with the rotating buff wheel. This buff wheel not only polishes the central reading surface, but polishes across the shoulder or sharp corner of the shoulder which separates the two surfaces, and as before described, rounds off said edge to form an inclined zone of variable curvature between the two surfaces. The distance surface may then be polished by tool —26— shown in Figure 7 and which is provided with an annular polishing ring —27— of felt or other material which will polish the reading surface during rotation of the tool —26— and its oscillation with respect to the formed blank.

Figure 5:
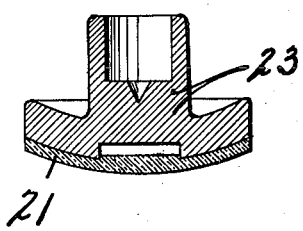
Figure 5 illustrates a method of forming the distance surface about the reading surface with a shoulder separating the two surfaces.

Any other suitable method of forming the lens blank in the form shown in Figure 5 may be utilized so that two fields of vision are produced, separated by a shoulder, which shoulder, when rounded off, will produce an inclined zone of variable curvature between the two optical surfaces, and reference is hereby made to my co-pending application Ser. No. 209,239 filed Dec. 28, 1917, of which this application forms a continuation in part.

It will be understood that although I have described the distance field as ground below the level of the reading field to form the shoulder essential to my process, that on the other hand, the reading field may be ground in a usual manner below the level of the distance field to produce the desired shoulder at the juncture of the two fields and that the process is substantially the same under either condition and that various changes and modifications may be made in the details of the process without departing from my invention.

What I claim is:

1. The process of producing a bifocal lens comprising grinding two optical fields of two different di-optrics upon one surface of a piece of glass, to form a reading field and a distance field, with a shoulder at the junction of the two fields, rotating the blank so produced upon the surface of a rotating polisher, which polishes across the said shoulder between the two fields of vision, thereby rounding off the said shoulder to form an inclined zone of varying curvature between the two fields of vision, and then polishing the distance field by means of an annular polisher provided with a central opening of a greater diameter than the diameter of the reading field.

2. In the manufacture of bifocal lenses from a single piece of glass, a step which consists in rounding off a vertical shoulder formed at the juncture of the two optical fields during the grinding operation to produce a narrow inclined zone of varying curvature between the two sections.

3. A bifocal lens comprising two optical fields of different dioptrics, and disposed at different elevations, and a narrow inclined non-optical zone of varying curvature between and connecting said surfaces.

4. A bifocal lens formed of a single piece of glass having produced thereon two optical fields of different dioptrics and disposed at different elevations, and a narrow inclined non-optical zone of varying curvature separating said optical fields, and leading from one to the other.

5. In the manufacture of bifocal lenses, the step which consists in rounding off a shoulder formed at the juncture of the two bifocal surfaces to form an inclined non-optical zone between the two optical surfaces.

6. In the manufacture of bifocal lenses, the step which consists in moving a polishing element across a shoulder intervening between the two optical fields to round off the said shoulder and form an inclined non-optical zone between the two optical surfaces.

In witness whereof I have hereunto set my hand this 31 day of October, 1919.

HAROLD J. STEAD.

Witnesses:
 HARRY D. MARSHALL,
 W. R. WELCH.